United States Patent [19]

Welschof

[11] Patent Number: 4,476,950
[45] Date of Patent: Oct. 16, 1984

[54] DRIVE ASSEMBLY FOR VEHICLE WHEEL

[75] Inventor: Hans-Heinrich Welschof, Rodenbach, Fed. Rep. of Germany

[73] Assignee: Löhr & Brompkamp GmbH, Offenbach am Main, Fed. Rep. of Germany

[21] Appl. No.: 426,177

[22] Filed: Sep. 28, 1982

[30] Foreign Application Priority Data

Oct. 13, 1981 [DE] Fed. Rep. of Germany ....... 3140540

[51] Int. Cl.³ .............................................. B60K 17/22
[52] U.S. Cl. ................................... 180/73.3; 464/167; 464/169
[58] Field of Search ............... 180/73.3; 464/162, 169, 464/167, 111, 113, 139, 140

[56] References Cited

U.S. PATENT DOCUMENTS

| 1,512,840 | 10/1924 | Flick | 464/169 |
|---|---|---|---|
| 2,231,117 | 2/1941 | Greiner | 464/167 |
| 2,942,678 | 6/1960 | Uhlenhaut et al. | 180/73.3 |
| 3,296,833 | 1/1967 | McCarthy | 464/169 |
| 3,678,706 | 7/1972 | Shirley et al. | 464/169 |
| 4,162,618 | 7/1979 | Okuda | 464/169 |
| 4,308,729 | 1/1982 | Condon | 464/162 |

FOREIGN PATENT DOCUMENTS

| 2633402 | 7/1976 | Fed. Rep. of Germany . | |
|---|---|---|---|
| 2749258 | 5/1978 | Fed. Rep. of Germany | 464/169 |
| 216906 | 6/1924 | United Kingdom | 464/169 |
| 427539 | 4/1935 | United Kingdom | 180/73.3 |
| 740153 | 11/1955 | United Kingdom . | |
| 1017678 | 1/1966 | United Kingdom . | |

Primary Examiner—John A. Pekar
Assistant Examiner—Kenneth R. Rice
Attorney, Agent, or Firm—Toren, McGeady and Stanger

[57] ABSTRACT

A drive assembly for the wheel of a motor vehicle having an independent wheel suspension wherein the wheel is connected to a drive source by means of a pair of universal joints connected between the drive source and the wheel transmitting torque therebetween with at least one of the universal joints being of the axially displaceable type. A damping mechanism or shock absorber device is interposed together with the universal joints between the wheel and the drive means and the shock absorber device may comprise either or both of a fluid damping mechanism or a spring damping mechanism.

3 Claims, 6 Drawing Figures

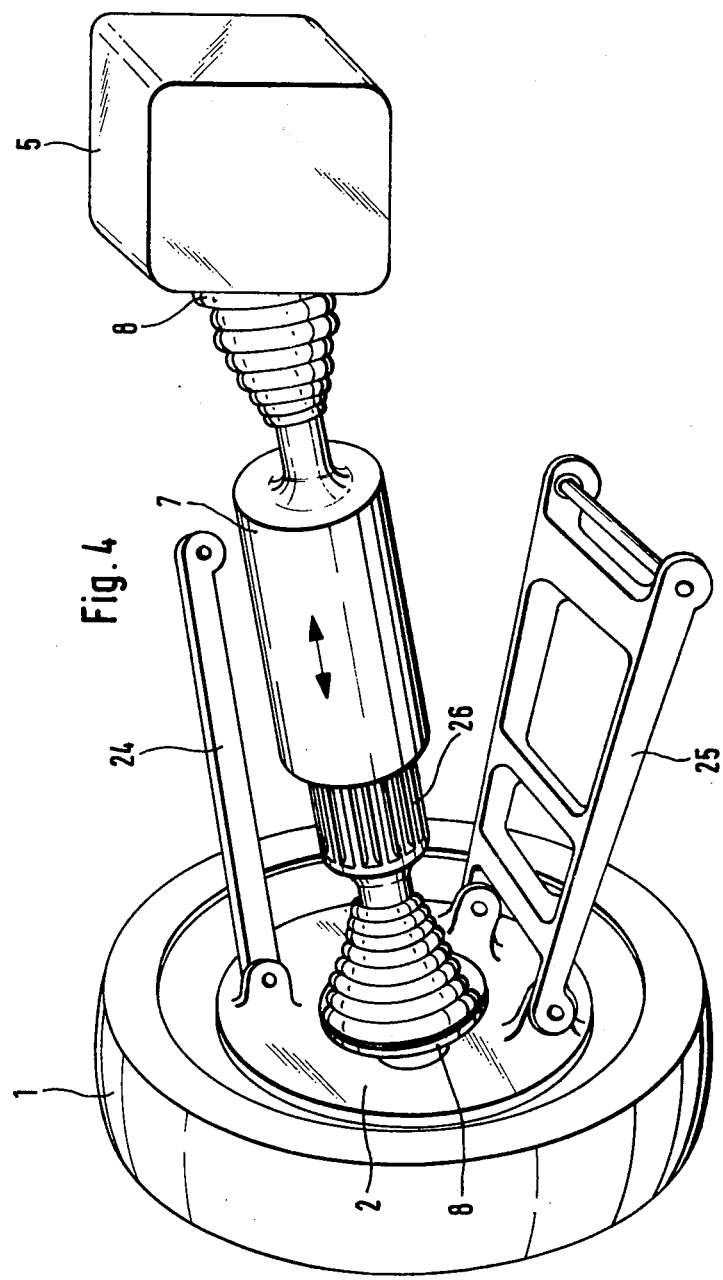

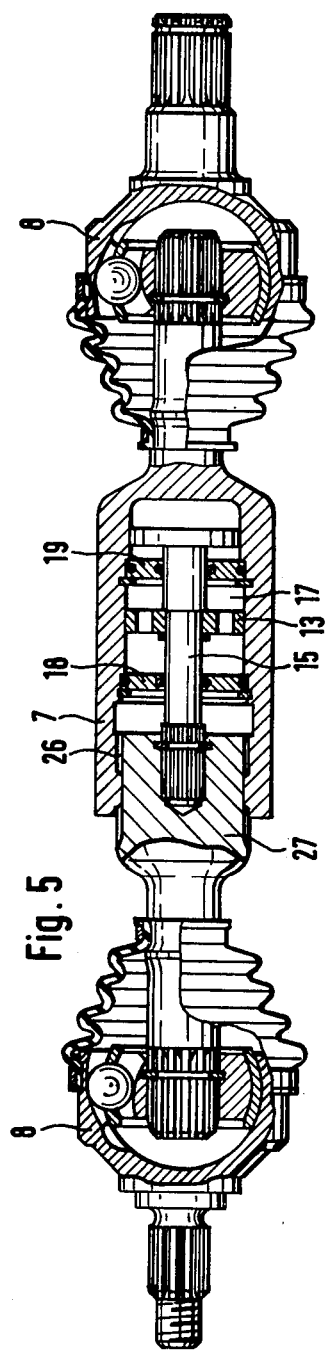
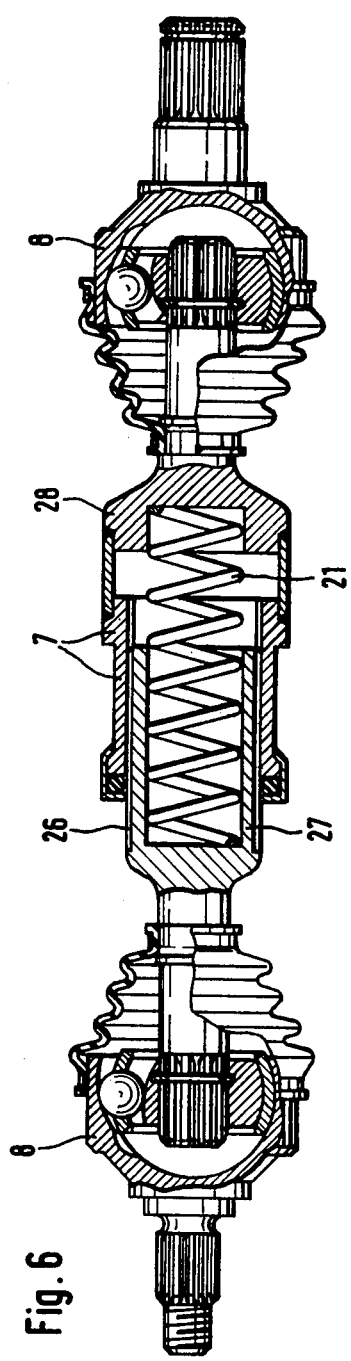

DRIVE ASSEMBLY FOR VEHICLE WHEEL

The present invention relates generally to drive assemblies for motor vehicle wheels and more particularly to a drive assembly for a wheel having an independent wheel suspension. The drive assembly of the type to which the present invention relates will involve two universal joints transmitting torque from a drive unit to the wheel with the drive shaft mechanism connecting the two joints.

Independent wheel suspension systems of the type to which the present invention relates are known in the prior art, for example, from German Offenlegungsschrift No. 26 33 402. It is known in the art that the drive shaft as well as the shock absorbers and the wheel carrier of such wheel assemblies are designed as independent components which form an independent wheel suspension system for driven vehicle wheels. Such an arrangement normally requires a larger number of individual components which could cause problems due to the restricted amount of space which is available in the vehicle during assembly thereof.

Accordingly, the invention is directed toward the achievement of a drive connection for an independently suspended vehicle wheel which enables the utilization of a pair of universal joints together with shock absorber means which may enable telescopic movement of the drive connection and which may comprise either or both of fluid damping means and spring damping means.

The invention is particularly directed toward provision of a shock absorber mechanism wherein the fluid and spring dampers may be integrated into the drive shaft connection. The drive shaft connection will accommodate supporting forces of the wheel suspension so that the entire wheel suspension unit may be simplified.

SUMMARY OF THE INVENTION

Briefly, the present invention may be described as a drive assembly for a motor vehicle wheel having an independent wheel suspension comprising drive means for the wheel, a pair of universal joints connected between the drive means and the wheel for transmission of torque therebetween, with at least one of the universal joints being of the axially displaceable or plunging type, and shock absorber means interposed together with two universal joints between the wheel and the drive means. The shock absorber means may comprise both a fluid type of damping means and a spring damping means or it may comprise one of said means only.

In accordance with a feature of the invention, one of the universal joints is a plunging or telescopically axially displaceable type of universal joint and is connected to the shock absorber means in such a way that the outer joint part and the shock absorber housing will be rigidly connected together and so that the inner joint part and a piston of the shock absorber will be firmly but angularly movably connected with each other. Thus, in a more detailed aspect of the invention, the plunging joint may be of the type which comprises inner and outer members, with the outer member being connected to, and preferably integral with, a cylinder of a telescopic damper and with the inner member of the joint being connected to a piston of the damper.

This has the advantage of integrating a telescopic damper with the drive shaft. The plunging distance of the plunging joint is approximately proportional to the bump travel of the wheel so that satisfactory damping may be obtained, as may be achieved by use of a separate damper unit. The outer member of the plunging joint and the cylinder of the telescopic damper are both generally cylindrical components so that the invention enables the two components to be advantageously combined into a single integral unit, thereby enabling the overall system to be more compact.

Instead of utilizing a plunging universal joint, this system may alternatively be formed so that both the universal joints are of the axially fixed type. In such an arrangement, the shaft element may have two relatively axially displaceable parts connected to one another for torque transmission, for example, by a sliding spline arrangement.

This is advantageous where the drive shaft may be subject to relatively great changes in length during its service life. The relatively displaceable parts of the shaft element may include a tubular outer part and an inner part of which the outer part may comprise a cylinder of a telescopic damper with the inner part being formed or connected to a piston of the damper.

Where the piston of a damper is connected to the inner member of a plunging universal joint, the connection is preferably established by way of a ball joint connecting the inner member to a piston rod. This is necessary to insure that the joint may be articulated. In addition to a damper, the drive shaft may also incorporate spring means, for example, a helical spring, a plurality of spring washers or a gas spring which may be arranged to be operative on the piston of the damper.

It is also possible to design the drive shaft in such a way that it constitutes a link of the suspension, i.e., is operative in controlling the path of movement of the wheel.

The various features of novelty which characterize the invention are pointed out with particularity in the claims annexed to and forming apart of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 4 is a perspective view of a further embodiment of a wheel suspension for a vehicle incorporating a drive assembly in accordance with the invention;

FIG. 5 is a sectional view through another embodiment of a drive a assembly of the invention; and FIG. 6 is a sectional view through a still further embodiment of a drive assembly in accordance with the invention.

DETAILED DESCRIPTION OF THE PREFERRED EMBODIMENTS

Figure 1:
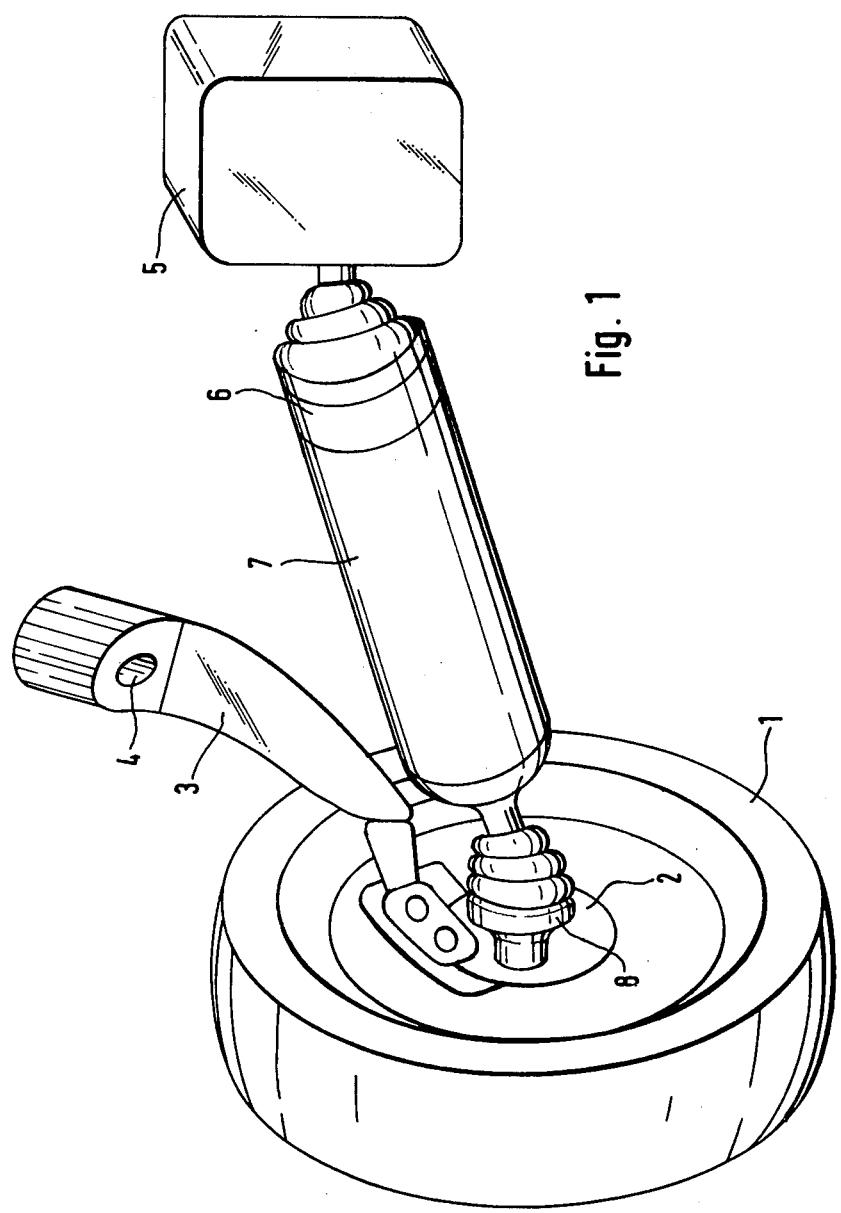
FIG. 1 is a perspective view of a drive assembly and wheel suspension system for a motor vehicle incorporating the present invention.
Figure 2:
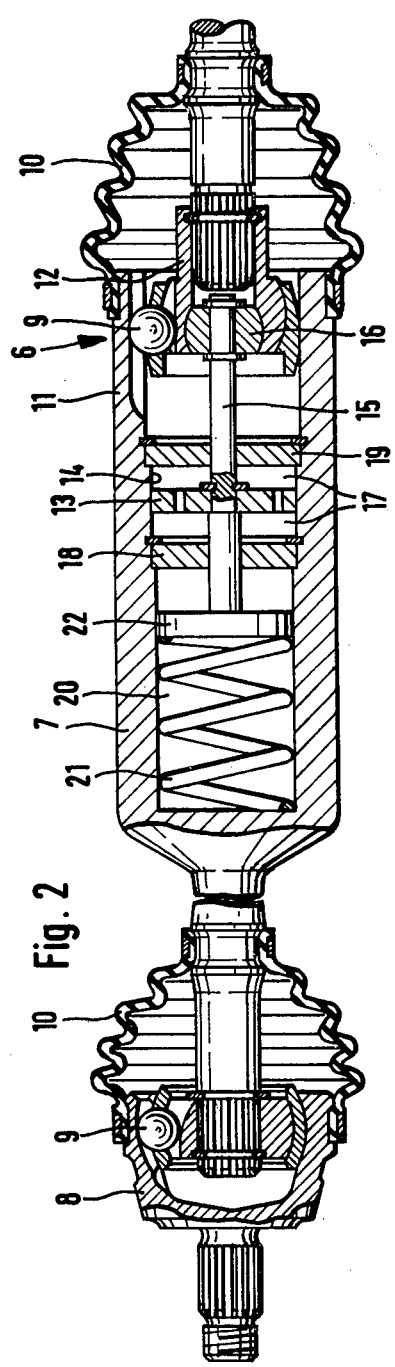
FIG. 2 is a sectional view through one embodiment of a drive assembly in accordance with the invention.

Referring now to the drawings, wherein like reference numerals are used to identify similar parts throughout the various figures thereof, and referring first more specifically to FIGS. 1 and 2, there is illustrated a drive assembly and independent suspension system for a motor vehicle wheel 1 including a link 3 pivoted to the structure of the vehicle at a bearing 4 and supporting the wheel by means of a hub bearing unit 2. The wheel is adapted to be driven from a transmission unit through drive means such as a differential 5. The drive or torque transmission to the wheel is accomplished by way of a drive assembly which, in the embodiment of FIGS. 1 and 2, comprises an inboard plunging universal joint 6 and an outboard non-plunging or fixed universal joint 8. A shaft mechanism 7 is arranged to interconnect joints 6 and 8.

The structure of the arrangement is such that over the entire range of bump travel of the wheel, a change in the effective length of the drive shaft mechanism occurs by way of plunging or axial movement of the universal joint 6. Thus, there occurs a change in the length between the two joints of the drive assembly.

The interconnecting drive mechanism of the assembly of the invention is shown more clearly in FIG. 2 wherein the plunging joint 6 at one end is attached to the fixed joint 8 at the other end through a drive shaft element 7. The inward plunging universal joint 6 and the outboard fixed universal joint 8 are conventional types of constant velocity ratio universal joints in which torque is transmitted between inner and outer members of each of the joints by balls 9. The joint interiors are sealed and protected by sealing boots 10 and an outer member 11 of the plunging joint 6 is formed as a tubular extension which constitutes the shaft element 7 and which terminates at a stub shaft which is connected to the inner member of the outer joint 8. The plunging joint 6 includes an inner member 12 which is connected so as to be movable relative to the outer joint member 11.

The shaft element 7 is formed so that it will constitute a tubular extension of the outer joint member 11 and thereby form the cylinder of a telescopic damping mechanism. The telescopic damping mechanism includes dividing walls 18 and 19 which are secured within the shaft element 7 so as to define a hollow space 17 which may be filled with a gas or liquid within which a piston 13 mounted on a piston rod 15 is movable. The piston 13 is provided with suitable apertures to provide a damping action by flow of fluid between the spaces 17 on opposite sides thereof. The piston rod 15 terminates at a ball member 16 whereby the piston rod is secured to the inner member 12 of the plunging universal joint 6 so as to be movable relative thereto while permitting articulation of the plunging joint. The piston rod 15 extends through a central aperture in the wall 18 and is provided at the other end thereof with a disc 22 against which there abuts a helical spring 21 arranged between the closed end of the shaft element 7 and the disc 22.

It will be seen that the elements of the telescopic shock absorber are contained within a bore 14 of the drive element 7 so that if the inner joint member 12 moves relative to the outer joint member 11, the piston 13 and the shock absorber mechanism previously described will operate to dampen this movement. The spring 21 is provided between the disc 22 and the end of the spring element 7 within a hollow space 20. As an alternative to the provision of the helical spring 21, there may be provided a plurality of spring washers which could be interposed between the disc 22 and the closed end of the shaft element 7 or the space 20 could be utilized as a gas spring.

Figure 3:
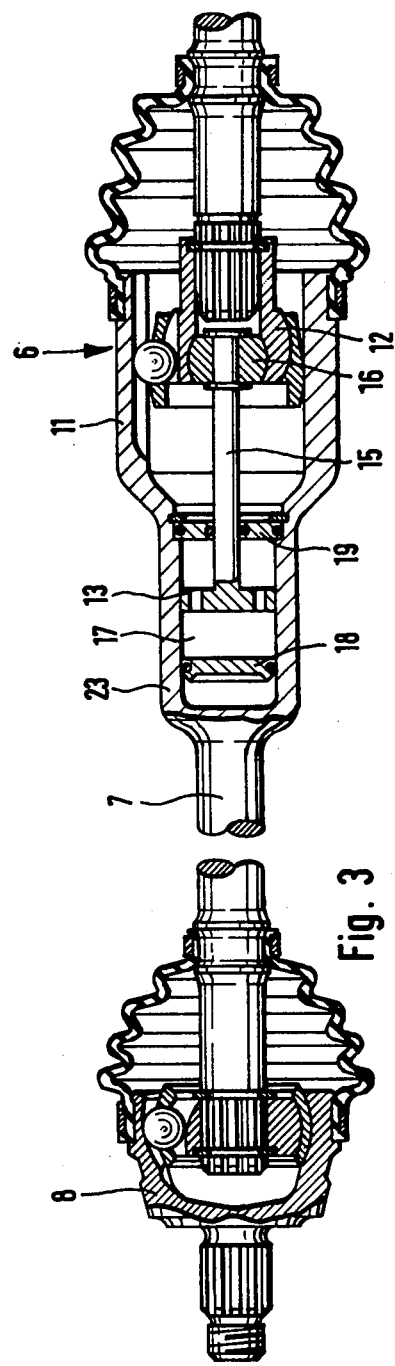
FIG. 3 is a sectional view through another embodiment of the drive assembly in accordance with the invention.

FIG. 3 shows a modified version of the drive assembly of FIG. 2 wherein once again, the outer joint member 11 is formed as a tubular member having a smaller diameter tubular extension 23 which forms the cylinder of a telescopic damper. Walls 18 and 19 define a space 17 within which a damper piston 13 is movable, with the piston 13 being connected by a piston rod 15 and ball joint 16 to the inner member 12 of the plunging joint 6. However, in the embodiment of FIG. 3, no springing means are provided and the fixed joint 8 is arranged at the opposite end of the plunging joint 6.

FIG. 4 illustrates a further embodiment of a wheel suspension and drive assembly in accordance with the invention wherein the wheel 1 is suspended by means of a wheel bearing 2 by an upper arm 24 and a lower arm 25. These arms connect the wheel hub and the bearing assembly to the vehicle structure. Power transmission is again effected from a transmission 5 through two joints 8 and through a drive element 7 arranged therebetween. However, in the case of the embodiment of FIG. 4, the two universal joints are of the axially fixed or non-plunging type and the shaft element 7 incorporates therein a sliding spline arrangement 26 so as to provide for variation in the length between the two joints.

FIG. 5 is a sectional view of an embodiment of the type depicted in FIG. 4 and it will be seen that the distance between the two joints 8 may be varied by telescopic action through a telescopic length adjusting device 26. The telescopic adjusting device or sliding spline connection 26 is established between an inner part 27 and an outer tubular part of the drive element, with the outer part constituting the cylinder of the telescopic damper. Again, walls 18 and 19 are provided to define the space 17 within which a piston 13 is reciprocally movable with the piston 13 being mounted on the piston rod 15 which is connected to the inner part 27. Again, the space 17 may be filled with a gas or liquid and in the case of FIG. 5, an embodiment is shown where a fluid damping device alone is disclosed.

Of course, it will be apparent that the invention may also be provided with a spring mechanism analogous to the embodiment of FIG. 2 which is operative between the piston rod 15 and the closed end of the outer part of the shaft element 7.

Alternatively, as shown in FIG. 6, a spring element alone may be provided and in the embodiment of FIG. 6, there is shown a drive shaft wherein the shaft element 7 is again formed in two parts with an inner part 27 having a spline connection 26 with the outer part. A helical spring 21 is arranged to be operative between the inner part 27 and an end member 28 connected to the outer part of the shaft element 7. Spring 21 in the embodiment of FIG. 6 provides the damping function.

Accordingly, it will be seen that the present invention provides a compact wheel suspension and drive system wherein a smaller number of components may operate to provide adequate performance in a more limited or restricted space. The drive assembly operates with an independent wheel suspension system with inboard and outboard universal joints having an interconnecting shaft element therebetween wherein the distance between the joints is variable by bump action of the wheel. Fluid and/or spring damping means are operative between the relatively movable universal joint parts of the drive assembly and the joints may comprise a fixed joint operating together with a plunging joint or two fixed joints with the springing and/or fluid damping means being arranged between part of the two joints so as to operate as a shock absorber system. In a case where two fixed joints are used, axial relative movement therebetween may be provided by a sliding spline connection in the shaft element itself and the springing and/or fluid damping means may be operative between the parts of the shaft element.

While specific embodiments of the invention have been shown and described in detail to illustrate the application of the inventive principles, it will be understood that the invention may be embodied otherwise without departing from such principles.

What is claimed is:

1. A drive assembly for a motor vehicle wheel having an independent wheel suspension comprising:

drive means for driving said wheel;

an axially movable universal joint including an inner joint member in driven engagement with said drive means and an outer joint member having a generally cylindrical extension extending axially beyond said joint toward said wheel;

an axially fixed universal joint connected in driving engagement between said wheel and said axially movable universal joint; and a fluidic shock absorber interposed between said fixed universal joint and said movable universal joint, said shock absorber comprising a cylindrical member defined by said outer joint member extension, a piston member in sliding engagement with said cylindrical member, a piston rod attached between said piston member and said inner joint member of said movable universal joint, and a ball joint interposed between said piston rod and said inner joint member of said movable universal joint.

2. An assembly according to claim 1 wherein said outer joint member and said generally cylindrical extension thereof which defines said cylindrical member are formed integrally with each other with said cylindrical extension having a smaller diameter than said outer joint member.

3. An assembly according to claim 2 further comprising a pair of lateral walls arranged on the interior of said cylindrical member operating to limit the stroke of said piston member.

* * * * *